United States Patent [19]

Bottomley

[11] Patent Number: 5,787,131
[45] Date of Patent: Jul. 28, 1998

[54] METHOD AND APPARATUS FOR MITIGATION OF SELF INTERFERENCE USING ARRAY PROCESSING

[75] Inventor: Gregory E. Bottomley, Cary, N.C.

[73] Assignee: Ericsson Inc., Research Triangle Park, N.C.

[21] Appl. No.: 577,337

[22] Filed: Dec. 22, 1995

[51] Int. Cl.[6] ............................... H04L 1/02; H03D 1/00
[52] U.S. Cl. ........................................... 375/347; 375/349
[58] Field of Search ............................. 375/347, 346, 375/348, 349, 299, 267; 455/132, 133, 134, 135, 139

[56] References Cited

U.S. PATENT DOCUMENTS

| | | | |
|---|---|---|---|
| 5,031,193 | 7/1991 | Atkinson et al. | 375/347 |
| 5,297,171 | 3/1994 | Koch | 375/347 |
| 5,319,677 | 6/1994 | Kim | 375/100 |
| 5,481,572 | 1/1996 | Sköld et al. | 375/347 |
| 5,499,272 | 3/1996 | Bottomley | 375/347 |
| 5,621,769 | 4/1997 | Wam et al. | 375/347 |

OTHER PUBLICATIONS

International Search Report re PCT/US96/19776 Date of Mailing Search Report: 18 Jun. 1997.

Fumiyuki Adachi et al., "BER Performance of QDPSK with Postdetection Diversity Reception in Mobile Radio Channels", *IEEE Transactiona on Vehicular Technology*, vol. 40, No. 1, pp. 237–249 (Feb. 1991).

Jack H. Winters, "Signal Acquisition and Tracking with Adaptive Arrays in the Digital Mobile Radio System IS–54 with Flat Fading", *IEEE Transactions on Vehicular Technology*, vol. 42., No. 4, pp. 377–384 (Nov. 1993).

"Blind Algorithms for Joint Clock Recovery and Baseband Combining in Digital Radio", F. Guglielmi et al., Radio Relay Systems, Conference Publication No. 386, IEE (Oct. 11–14, 1993).

"Joint Clock Recovery and Baseband Combining for the Diversity Radio Channel", F. Guglielmi et al., IEEE Transactions on Communications, vol. 44, No. 1 (Jan. 1996).

*Primary Examiner*—Stephen Chin
*Assistant Examiner*—Kevin Kim
*Attorney, Agent, or Firm*—Burns, Doane, Swecker & Mathis L.L.P.

[57] ABSTRACT

A diversity receiver for use in radio communication systems is described. Using array processing techniques, intersymbol interference can be mitigated from a desired signal. Channel tap estimates of the desired signal are used explicitly to cancel intersymbol interference as opposed to conventional techniques which use equalizers.

11 Claims, 2 Drawing Sheets

METHOD AND APPARATUS FOR MITIGATION OF SELF INTERFERENCE USING ARRAY PROCESSING

BACKGROUND

The present invention generally relates to the demodulation of a digital communications radio signal received by a plurality of antennas in the presence of multipath time dispersion.

Digital wireless communication systems are being deployed around the world to provide convenient, cost-effective communication services. One of the challenges in such systems is mitigating the effects of multipath propagation, which results when the transmitted signal travels along several paths to the intended receiver. When the path lengths are relatively small, the multiple signal images arrive at almost the same time. When they add together, they do so constructively or destructively, giving rise to fading, which typically has a Rayleigh distribution. When the path lengths are relatively large, the transmission medium is considered time dispersive, and the added images can be viewed as echoes of the transmitted signal, giving rise to intersymbol interference (ISI).

Fading can be mitigated by having multiple receive antennas and employing some form of diversity combining of the signals received by each antenna, such as selective combining, equal gain combining, or maximal ratio combining. Diversity combination takes advantage of the fact that the fading on the different antennas is not the same, so that when one antenna has a faded signal, chances are the other antenna does not.

ISI from multipath time dispersion is traditionally mitigated by some form of equalization, such as linear equalization, decision feedback equalization, or maximum likelihood sequence estimation (MLSE). However, the complexity of such schemes increases with the number of echoes that need to be resolved. For MLSE, the increase in complexity is exponential.

Another approach for handling ISI is to use multiple receive antennas and diversity combining. This approach is analyzed in an article authored by F. Adachi, and identified as "BER performance of QDPSK with postdetection diversity reception in mobile radio channels," *IEEE Trans. Veh. Technol.*, vol. 40, pp. 237–249, February 1991. The analysis shows that the technique works well, so long as the delay spread, i.e., the delay between the first and last significant signal image arrival, is small relative to a symbol period (e.g. less than 3/10 of a symbol period). So, when the delay spread is small, equalization can be avoided by using diversity combining. However, when the delay spread is significant, diversity combining is not sufficient to mitigate the ISI. Accordingly, it would be desirable to improve the usage of diversity combining to mitigate ISI when the delay spread is significant.

SUMMARY

These and other drawbacks and limitations of conventional techniques and systems which use diversity combining are solved according to the present invention by using array processing techniques to mitigate ISI from the desired signal. Channel tap estimates of the desired signal are used explicitly to cancel ISI instead of equalizing ISI. The present invention is also used to mitigate residual ISI not covered by an equalizer. For example, if ISI is found outside of the range of a receiver's equalizer, the inventive techniques can be used to mitigate this ISI.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

Figure 1:
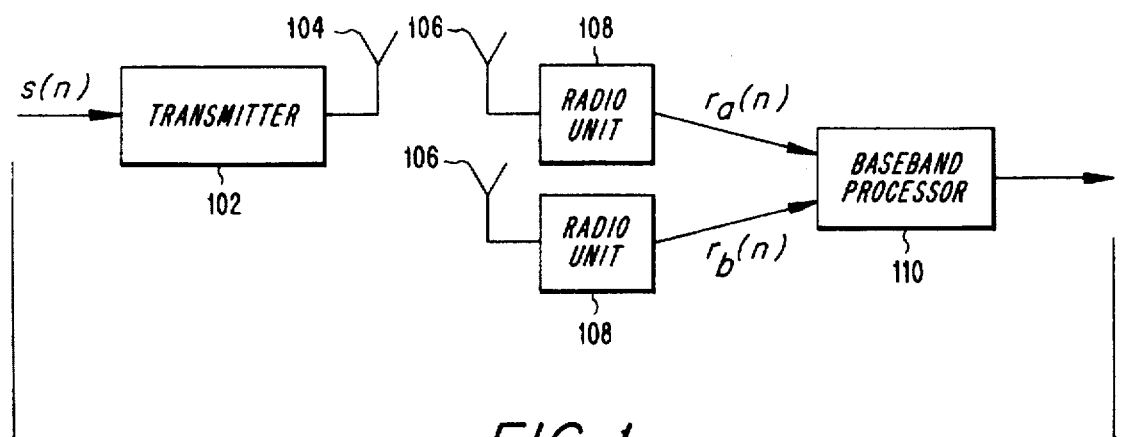
FIG. 1 is a block diagram of an exemplary conventional digital wireless communication system.

Shown in FIG. 1 is a block diagram of a digital wireless communication system. Digital information symbols, denoted s(n), are passed to a transmitter 102, which converts the symbol stream to a radio waveform for transmission using antenna 104. The transmitted signal is received by a plurality of receive antennas 106. Each antenna signal is processed by a radio unit 108, which filters, amplifies, mixes, and samples the signal appropriately, giving rise to a sequence of received samples. These received samples are processed in baseband processor 110 to produce a sequence of detected digital symbol values.

With traditional diversity combining, such as maximal ratio combining, the baseband processor 110 would work as follows. Let $r_a(n)$ and $r_b(n)$ denote the received sample streams on antennas a and b respectively. These sample streams can be modeled as:

$$r_x(n) = c_x(0)s(n) + z_x(n) \qquad (1)$$

where x denotes antenna, $c_x(0)$ is the channel tap associated with the desired signal and antenna x, and $z_x(n)$ denotes the impairment (noise plus other signal interference). Typically, in-phase (I) and quadrature (Q) components of the received signals are treated as single, complex samples, so that the received samples, the channel taps, the impairment samples, and possibly the information symbol values are complex numbers.

The baseband processor would form detection statistics using a weighted sum of the received samples. This would be done by estimating channel taps and the impairment power on each antenna, denoted $Z_x$. The weights, $w_a$ and $w_b$, would be computed as follows:

$$w_x = \frac{c_x(0)}{Z_x} \qquad (2)$$

Then, detection statistics y(n) would be computed as follows:

$$y(n) = w_a^* r_a(n) + w_b^* r_b(n) \qquad (3)$$

where superscript "*" denotes complex conjugate. A detector would then be used to determine which symbol value each detection statistic is closest to.

Figure 2:
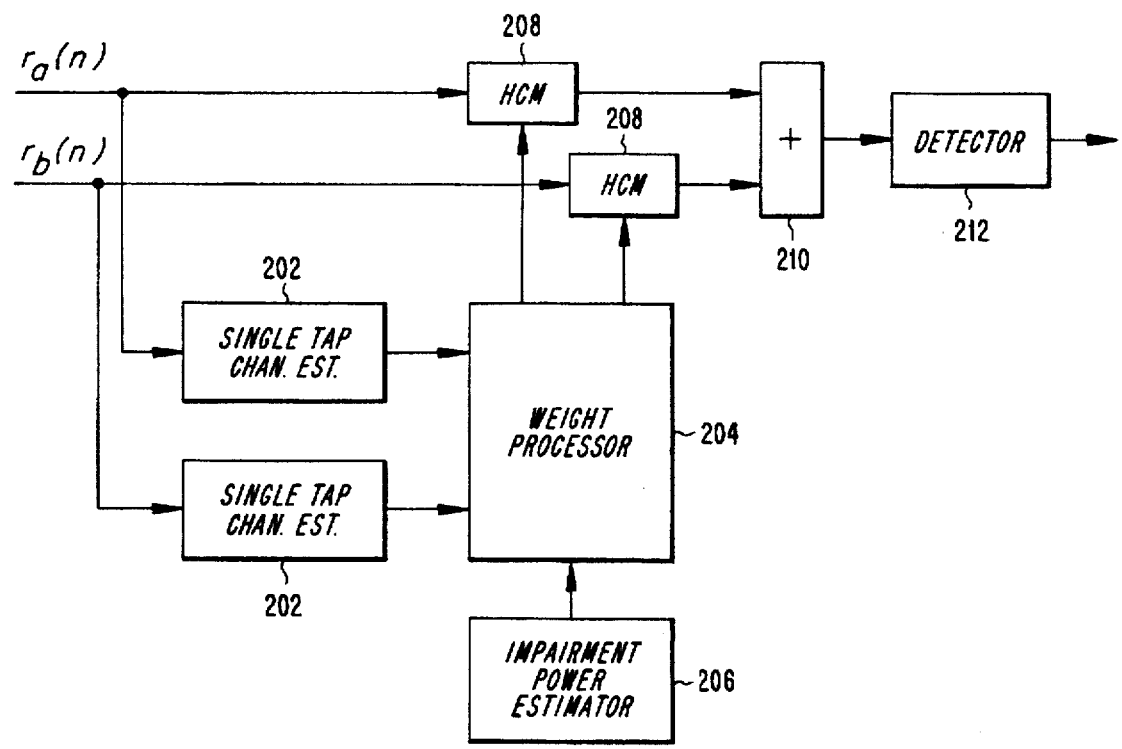
FIG. 2 is an example of conventional diversity combining.

A block diagram illustrating this traditional approach is shown in FIG. 2. Each received sample stream is used by a corresponding single tap channel estimator 202 to estimate the single channel tap associated with the desired signal. One channel tap per antenna is provided to weight processor 204. As used herein, the term "processor" refers to any device or software routine which processes data. Accordingly, all or any of the processors described herein may be implemented using a one or more physical devices, e.g., IC packages. An impairment estimator 206 is used to estimate the power levels of the impairment on the different antennas. Though not shown, the impairment power estimator 206 may use received signal samples, a channel tap estimate per antenna, and known or detected information symbols to estimate the impairment powers by averaging impairment sample values. The weight processor 204 determines the combining weights, as described in equation (2). Then, each half complex multiplier (HCM) 208 forms the real part of the product of the conjugate of the weight with the received signal sample. The products are summed in adder 210, giving the detection statistic, which is provided to detector 212 to determine the information symbols sent.

Array processing techniques can be used to improve the performance of the diversity combiner. Consider, for example, the techniques described in the article authored by J. H. Winters, and identified as "Optimum combining in digital mobile radio with co-channel interference," *IEEE J. Sel. Areas Commun.*, vol. 2, pp. 528–539, July 1984 and the article authored by J. H. Winters, and identified as "Signal acquisition and tracking with adaptive arrays in the digital mobile radio system IS-54 with flat fading," *IEEE Trans. Veh. Technol.*, vol. 42, pp. 377–384, November 1993. These techniques are typically used to reject interference from other communication signals. In FIG. 2, the impairment estimator would be replaced by a data correlation estimator, which would estimate the data correlation matrix $R_{rr}$ given by:

$$R_{rr} = E\left\{ \begin{bmatrix} r_a(n) \\ r_b(n) \end{bmatrix} [r_a^*(n)\ r_b^*(n)] \right\} \quad (4)$$

where E{ } denotes expected value or average. The weights would then be computed using $$\begin{bmatrix} w_a \\ w_b \end{bmatrix} = R_{rr}^{-1} \begin{bmatrix} c_a \\ c_b \end{bmatrix} \quad (5)$$

In the 1993 Winters paper, the data correlation matrix is estimated and tracked with time, as are the channel tap values. In the 1984 Winters paper, an implementation using an LMS adaptive approach for finding the weights is given. However, it is pointed out that, theoretically, the weights can be computed in a manner similar to equation (5), except that the data correlation matrix is replaced by the impairment correlation matrix, so that $$\begin{bmatrix} w_a \\ w_b \end{bmatrix} = R_{zz}^{-1} \begin{bmatrix} c_a \\ c_b \end{bmatrix} \quad (6)$$

In practice, one could estimate the impairment correlation matrix as described in U.S. patent application Ser. No. 08/284,775 to Bottomley, the disclosure of which is incorporated here by reference. This estimation can be performed by averaging impairment value products, where the impairment values are formed by taking the difference between the received signal and the expected signal.

According to exemplary embodiments of the present invention, a demodulator based on the theoretical result in equation (6) is used to combat ISI from the desired signal instead. Assuming echoes of the desired signal are the main source of impairment, channel tap estimates can be used to simplify the process. Specifically, instead of estimating the impairment correlation matrix from impairment samples, the impairment correlation matrix is constructed using products of echo channel tap values.

This approach is illustrated first by example. Suppose the received signals consist of two images of the desired signal, a first ray (associated with s(n)) and a second ray (associated with s(n−1)), so that $$r_x(n) = c_x(0)s(n) + c_x(1)s(n-1) \quad (7)$$

The impairment corresponds to the second ray image in this example. With estimates of the second ray channel taps, the impairment correlation matrix can be constructed as:

$$R_{zz} = \begin{bmatrix} |c_a(1)|^2 & c_a(1)c_b^*(1) \\ c_b(1)c_a^*(1) & |c_b(1)|^2 \end{bmatrix} \quad (8)$$

For this particular example, the impairment correlation matrix is singular, so that direct application of equation (6) is not possible. Accordingly, the adjoint of the matrix can be used, so that the weights become:

$$\begin{bmatrix} w_a \\ w_b \end{bmatrix} = \begin{bmatrix} |c_b(1)|^2 & -c_a(1)c_b^*(1) \\ -c_b(1)c_a^*(1) & |c_a(1)|^2 \end{bmatrix} \begin{bmatrix} c_a(0) \\ c_b(0) \end{bmatrix} = \begin{bmatrix} |c_b(1)|^2 c_a(0) - c_a(1)c_b^*(1)c_b(0) \\ |c_a(1)|^2 c_b(0) - c_b(1)c_a^*(1)c_a(0) \end{bmatrix} \quad (9)$$

The weights $w_a$ and $w_b$ would then be used to combine the received signal samples, as in equation (3).

To show that this approach removes the ISI from the second ray, this example is analyzed. Substituting equation (9) and then equation (7) into equation (3) gives $$y(n) = (|c_b(1)|^2 c_a(0) - c_a(1)c_b^*(1)c_b(0))^* r_a(n) + (|c_a(1)|^2 c_b(0) - c_b(1)c_a^*(1)c_a(0))^* r_b(n) = (c_a(0)c_b(1) - c_b(0)c_a(1))^2 s(n) \quad (10)$$

Observe that in equation (10), there is no term with s(n−1). Thus, the second image echo has been cancelled when forming the detection statistic.

In general, there may be more than two rays. In those cases, one ray would correspond to the desired signal and the rest would correspond to ISI. The impairment correlation matrix would then be the sum of the outer products of the other ray channel tap vectors, where each vector corresponds to a particular path delay. For example, with 2 antennas and 3 channel taps each, then $$R_{zz} = \begin{bmatrix} |c_a(1)|^2 & c_a(1)c_b^*(1) \\ c_b(1)c_a^*(1) & |c_b(1)|^2 \end{bmatrix} + \begin{bmatrix} |c_a(2)|^2 & c_a(2)c_b^*(2) \\ c_b(2)c_a^*(2) & |c_b(2)|^2 \end{bmatrix} \quad (11)$$

which is generally nonsingular, so that an inverse can be taken.

Figure 3:
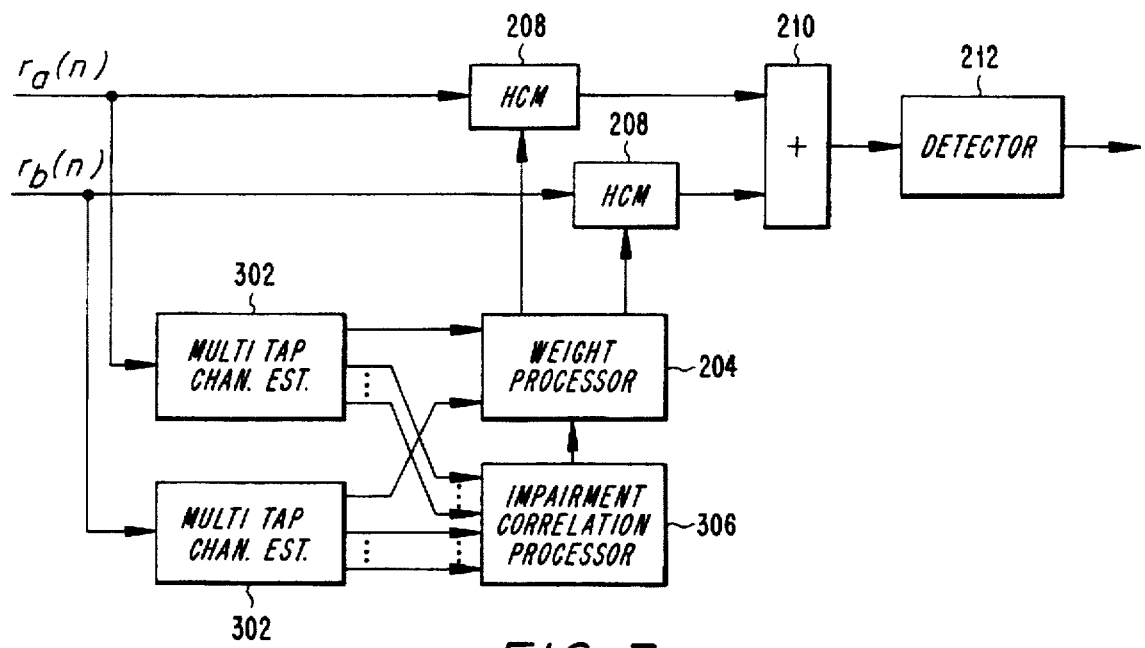
FIG. 3 is a block diagram, illustrating an exemplary embodiment of the present invention; and, FIG. 4 is a block diagram illustrating another exemplary embodiment of the present invention.

A block diagram of an exemplary embodiment of the present invention is given in FIG. 3. Each antenna's received sample stream is provided to a multi-tap channel estimator 302, which models the channel using a plurality of channel taps. One channel tap estimate from each antenna is provided to the weight processor 204. The rest of the channel tap estimates are provided to the impairment correlation processor 306, which computes an impairment correlation matrix using the channel tap estimates. Then, as in FIG. 2, the weight processor 204, the HCMs 208, the summer 210, and the detector 212 are used to form a detected information symbol stream.

In a second exemplary embodiment of the present invention, the baseband processor uses an equalizer, but the number of channel tap estimates used by the equalizer is less than the number of channel tap estimates available. The channel taps not used by the equalizer are used to form an impairment correlation matrix.

This second embodiment is first illustrated with an example. Suppose the received signals consist of three images of the desired signal, a first ray (associated with s(n)), a second ray (associated with s(n−1)), and a third ray (associated with s(n2)) so that $$r_x(n)=c_x(0)s(n)+c_x(1)s(n-1)+c_x(2)s(n-2) \quad (12)$$

The baseband processor uses, for example, an MLSE based procedure as described in the above-incorporated Bottomley patent application, except that it is based on only the first two rays. Thus, the baseband processor forms and accumulates branch metrics of the form:

$$M_h(n)=E_h^H(n)R_{zz}^{-1}E_h(n) \quad (13)$$

where $$E_h(n) = \begin{bmatrix} e_{a,h}(n) \\ e_{b,h}(n) \end{bmatrix} \quad (14)$$

$$e_{x,h}(n) = r_x(n) - c_x(0)s_h(n) - c_x(1)s_h(n-1) \quad (15)$$

The detected symbol sequence is then one that minimizes the accumulated branch metric. The impairment would correspond to the third ray image. With an estimate of the third ray channel tap, the impairment correlation matrix can be formed as:

$$R_{zz} = \begin{bmatrix} |c_a(2)|^2 & c_a(2)c_b^*(2) \\ c_b(2)c_a^*(2) & |c_b(2)|^2 \end{bmatrix} \quad (16)$$

For this particular example, the impairment correlation matrix is singular, so that direct application of equation (12) is not possible. The adjoint of the matrix can be used, so that the matrix inverse is approximated by $$R_{zz}^{-1} = \begin{bmatrix} |c_a(2)|^2 & -c_a(2)c_b^*(2) \\ -c_b(2)c_a^*(2) & |c_a(2)|^2 \end{bmatrix} \quad (17)$$

This matrix would then be used to form branch metrics, as in equation (13).

To show that this approach removes the ISI from the third ray, consider the branch metric corresponding to the correct hypothesis, so that the hypothesis subscript may be dropped. Then, substituting equation (17) and equation (12) into equation (13), the resulting branch metric for the correct hypothesis is zero, which is the smallest possible branch metric value, since the branch metric is a quadratic term. The fact that the branch metric does not include a term from the third ray implies that the third ray has been cancelled. In general, the impairment correlation matrix can be formed using a number of nonequalized channel tap estimates.

Figure 4:
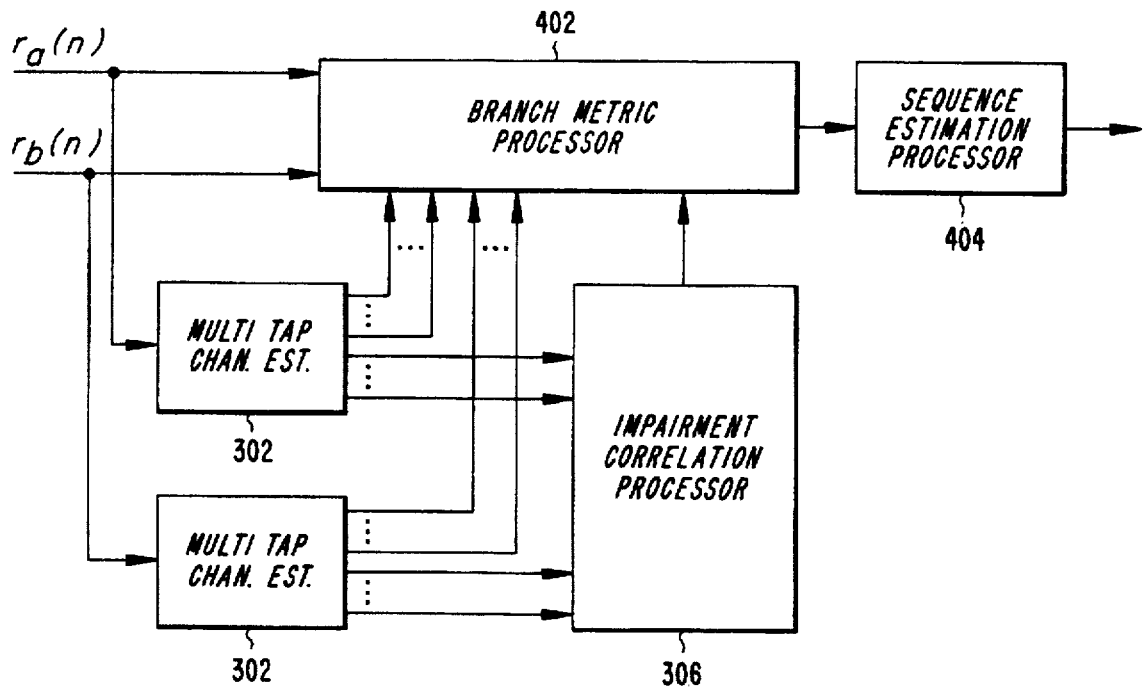

A block diagram depicting an exemplary configuration of the second embodiment is shown in FIG. 4, in which like elements correspond to those shown in FIG. 3. For each antenna received sample stream, multi-tap channel estimators are used to form a plurality of channel tap estimates for the desired signal. A subset of these are sent to the branch metric processor 402 as channel tap estimates. The remaining subset of channel tap estimates, containing ISI channel tap estimates, is sent to an impairment correlation processor 306, which forms the impairment correlation matrix for the branch metric processor 402. The branch metric processor 402 forms branch metrics using the received signal samples, the subset of channel tap estimates provided by the multi-tap channel estimators 302, and the impairment correlation matrix provided by impairment correlation processor 306. The branch metrics are accumulated in sequence estimation processor 404 to determine the detected information symbol sequence. A common choice for the sequence estimation algorithm is the Viterbi algorithm.

Both embodiments of the present invention can be adapted to provide both ISI and interference rejection. This is done by modifying the impairment correlation processor 306 to include terms related to other impairments, such as co-channel interference and/or thermal noise. This can be done as follows. The correlation matrix associated with other impairments can be estimated by averaging other impairment sample products, where other impairment samples are obtained by taking received samples and subtracting out all of the desired signal, making use of all the channel tap estimates. This other impairment correlation matrix is then added to the correlation matrix formed by the ISI channel tap estimates. Thus, part of the matrix is formed by averaging residual values, i.e. the portion remaining after removing the desired signal, whereas the other part of the matrix is formed by using ISI channel tap estimates.

Also, as discussed in the Bottomley patent, the impairment correlation matrix is only one of several forms that can be used to represent impairment correlations. Other forms include the inverse of the impairment correlation matrix or a subset of its elements, as well as the square root of the matrix.

While not shown, it will be known to persons skilled in the art how the present invention can be applied when there are more than two antennas. Also, the present invention can be applied to other types of receive channels, not just those associated with different antennas.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What I claim is:

1. In a digital wireless communications system for conveying digital information symbols, a receiver comprising:

means for receiving a radio signal on a plurality of antennas to produce a plurality of antenna signals;

means for radio processing said antenna signals to produce a plurality of received sample streams;

means for estimating a plurality of channel taps corresponding to each of said received sample streams;

means for dividing said plurality of channel taps into a first set of channel taps and a second set of channel taps;

means for forming impairment correlations using said second set of channel taps; and means for detecting said information symbols using said received sample streams, said first set of channel taps, and said impairment correlations.

2. A receiver according to claim 1 in which said means for detecting further comprises:

means for forming weights using said first set of channel taps and said impairment correlations;

means for forming products of said weights with said received samples;

means for summing said products to form sums; and means for detecting said information symbols using said sums.

3. A receiver according to claim 1 in which said means for detecting further comprises:

means for forming hypothesized information symbols;

means for forming branch metrics using said first set of channel taps, said hypothesized information symbols, and said impairment correlations;

means for accumulating branch metrics in a sequence estimation algorithm to form accumulated metrics; and means for detecting said information symbols using said accumulated metrics.

4. A receiver according to claim 1 in which said means for forming impairment correlations further comprises:

means for forming impairment samples;

means for forming first impairment correlations using said impairment samples;

means for forming second impairment correlations using said second set of channel taps; and means for adding said first impairment correlations to said second impairment correlations to form impairment correlations.

5. A method for receiving symbols comprising the steps of:

receiving a radio signal on a plurality of antennas to produce a plurality of antenna signals;

processing said antenna signals to produce a plurality of received sample streams;

estimating a plurality of channel taps corresponding to each of said received sample streams;

dividing said plurality of channel taps into a first set of channel taps and a second set of channel taps;

forming impairment correlations using said second set of channel taps; and detecting said symbols using said received sample streams, said first set of channel taps and said impairment correlations.

6. The method of claim 5 wherein said step of detecting further comprises the steps of:

forming weights using said first set of channel taps and said impairment correlations;

forming products of said weights with said received samples;

summing said products to form sums; and detecting said symbols using said sums.

7. The method according to claim 5 wherein said step of detecting further comprises the steps of:

forming hypothesized information symbols;

forming branch metrics using said first set of channel taps, said hypothesized information symbols and said impairment correlations;

accumulating branch metrics in a sequent estimation algorithm to form accumulated metrics; and detecting said symbols using said accumulated metrics.

8. The method according to claim 5 in which said step of forming impairment correlations further comprises the steps of:

forming impairment samples;

forming first impairment correlations using said impairment samples;

forming second impairment correlations using said second set of channel taps; and adding said first impairment correlations to said second impairment correlations to form impairment correlations.

9. A receiver comprising:

at least two antennas, each of which provide a received sample stream associated with a radio signal;

a multitap channel estimator for receiving said sample streams and providing a channel tap estimate associated with each antenna's received sample stream to a weight processor and for providing a plurality of channel tap estimates to an impairment correlation processor;

wherein said impairment correlation processor uses said channel tap estimates to compute an impairment correlation matrix, which matrix is provided to said weight processor; and wherein said weight processor uses said channel tap estimate from each antenna and said impairment correlation matrix to provide weights to a detector which detects symbols associated with each received sample stream.

10. A receiver comprising:

at least two antennas each of which provides a received sample stream associated with a received signal;

a multitap channel estimator which receives said sample streams from each of said at least two antennas and determines a plurality of channel tap estimates;

an impairment correlation processor for determining an impairment correlation matrix using at least some of said channel tap estimates;

a branch metric processor for receiving at least some of said channel tap estimates from said multitap channel estimator and said impairment correlation matrix from said impairment correlation processor to form branch metrics associated with hypotheses of symbols represented by said received sample streams; and a sequence estimation processor for receiving said branch metrics and determining a detected information symbol sequence.

11. The receiver of claim 10 wherein said sequence estimation processor employs the Viterbi algorithm.

* * * * *